United States Patent [19]

Lietz et al.

[11] Patent Number: 4,687,594

[45] Date of Patent: Aug. 18, 1987

[54] EMULSIFIERS USEFUL IN THE MANUFACTURE OF HIGH SOLIDS EMULSION POLYMERS

[75] Inventors: Dennis E. Lietz, Deerfield; Carleen C. Whittern, Lindenhurst, both of Ill.

[73] Assignee: Stepan Company, Northfield, Ill.

[21] Appl. No.: 733,282

[22] Filed: May 10, 1985

[51] Int. Cl.$^4$ .................... B01F 17/02; C11D 1/12
[52] U.S. Cl. .................... 252/352; 252/551; 252/353
[58] Field of Search ............ 252/551, 353, 352, 354

[56] References Cited

U.S. PATENT DOCUMENTS

| | | | |
|---|---|---|---|
| 3,265,722 | 8/1966 | Dudley | 252/551 X |
| 3,423,353 | 1/1969 | Levine | 526/210 X |
| 3,953,386 | 4/1976 | Murphy | 526/319 X |
| 4,011,388 | 3/1977 | Murphy | 526/320 |
| 4,187,192 | 2/1980 | Sheridan | 252/314 X |
| 4,203,879 | 5/1980 | DeWald et al. | 524/317 X |
| 4,283,321 | 8/1981 | Chakrabarti | 526/222 X |
| 4,336,173 | 6/1982 | Ugelstad | 524/836 |
| 4,409,355 | 10/1983 | Heimberg | 526/87 X |
| 4,459,378 | 7/1984 | Ugelstad | 523/205 |
| 4,517,324 | 5/1985 | Luhmann et al. | 524/310 X |
| 4,529,767 | 7/1985 | Bashleben | 524/323 |
| 4,554,018 | 11/1985 | Allen | 524/831 X |

Primary Examiner—John F. Terapane
Assistant Examiner—Catherine S. Kilby

[57] ABSTRACT

A surfactant for use in the preparation of high solids emulsion polymers comprises nonyl phenol tetra ethoxylate, the sulfate salt of the tetra ethoxylate and a sulfate salt.

4 Claims, No Drawings

EMULSIFIERS USEFUL IN THE MANUFACTURE OF HIGH SOLIDS EMULSION POLYMERS

BACKGROUND OF THE INVENTION

1. Field of the Invention

This invention relates to the field of surfactants and more particularly to a surfactant which enables the manufacture of emulsion polymers at high solids levels.

2. Description of the Prior Art

Vinyl acetate copolymer emulsions having a solids content of 65% by weight are known and some are articles of commerce. Such emulsions, however, often require high levels of surfactant or protective colloid to achieve the required stability to shearing forces and to freezing. In addition, such techniques as delayed surfactant addition or the use of monomer pre-emulsions are often required in order to achieve manageable viscosities. These departures from conventional practice, while successfully producing 65% solids latexes, can lead to undesirable properties such as reduced resistance to moisture and unsatisfactory rheological properties. The variations from conventional procedures may also require equipment changes and result in a more expensive process.

High solids vinyl acetate emulsion polymers are prepared by various methods. Such polymers may be prepared using pre-emulsified monomers or using a higher than normal surfactant level. Still another method uses delayed surfactant addition. U.S. Pat. No. 4,409,355 uses a multistage monomer addition to prepare latexes with 60% or more solids. In U.S. Pat. No. 3,423,353, large increments of initiator are added after the reaction is completed to achieve the desired viscosity.

Accordingly, it is an object of the present invention to provide a surfactant which eliminates the need for such complex methods for preparing high solids emulsion polymers. It is a related object of the present invention to provide a surfactant which may be used to prepare stable, high solids emulsion polymers simply and economically.

SUMMARY OF THE INVENTION

The invention comprises a surfactant which enables emulsion polymers to be prepared at high solids levels via simple processes, at reasonable surfactant levels, and in readily available equipment. The surfactant comprises a blend of a nonyl phenol tetra ethoxylate, the salt of a sulfated nonyl phenol tetra ethoxylate and a sulfate salt. The concentration of each of these materials may vary. Preferably the nonyl phenol tetra ethoxylate and the sulfated derivative thereof comprise the major proportion, by weight, of the surfactant. Most preferbly, the surfactant comprises about 37 wt.% nonyl phenol tetra ethoxylate, about 53 wt.% nonyl phenol tetra ethoxylate sulfate, and 10 wt.% sodium sulfate.

In the preparation of an emulsion polymer the surfactant components may be charged in their entirety to the reactor prior to reaction, thereby allowing the monomers to be added as a simple blend. The process for preparation of high solids emulsion polymers is therefore simplified and the chance for error is greatly reduced. The reaction requires less operator attention and thus is less costly. The process yields a low viscosity product with good stability.

The surfactant may be made by partially reacting the nonyl phenol tetra ethoxylate with a sulfating agent to form the appropriate sulfated ethoxylate/ethoxylate mixture, or by simply mixing the three ingredients.

DETAILED DESCRIPTION OF THE INVENTION

The surfactant of the present invention consists of a blend of three essential components. The first component is a nonionic surfactant made by reacting nonyl phenol with ethylene oxide to form a polyether containing, on the average, four moles of ethylene oxide. The average is determined from the hydroxyl value of the polyether surfactant. The reaction product is referred to as nonyl phenol tetra ethoxylate or as the tetra ethoxylate. The second component is formed by reacting the tetra ethoxylate with a suitable sulfating agent such as, for example, sulfur trioxide. The acid product from this reaction is neutralized with a base of choice, for example, an alkali metal hydroxide such as sodium hydroxide. Other examples of suitable bases would include ammonium hydroxide and amines. The third component is the sulfate of the neutralizing base. When sodium hydroxide is used as the neutralizing base, the third component is sodium sulfate.

The surfactant blend of the present invention can be prepared in several ways. Illustrative of the techniques which may be used are the following. The blend can be made by partial sulfation of the nonyl phenol tetra ethoxylate, i.e., by reacting nonyl phenol tetra ethoxylate with somewhat less than an equimolar quantity of sulfur trioxide such that the resulting product is approximately 60% by weight anionic ether sulfate and approximately 40% nonionic nonyl phenol tetra ethoxylate. An aqueous dispersion of the anionic and nonionic components is prepared to which is added sodium sulfate such that the final product contains 2.9% sodium sulfate by weight of the total dispersion. The sodium sulfate serves to stabilize the dispersion. The three components are effective over a range of concentrations. The non-volatile content of the final dispersion is determined by evaporation for two hours in a drying oven maintained at 105° C., and is about 29%.

The blend may also be prepared prior to charging the polymerization vessel by mixing about 37 parts of the nonionic nonyl phenol tetra ethoxylate with about 53 parts of the fully reacted nonyl phenol tetra ethoxysulfate and about 10 parts of sodium sulfate.

Alternatively, the unmixed surfactant components may simply be charged to the polymerization vessel. Any of these methods may be used without departing from the invention.

The surfactant of the present invention is useful in the emulsion polymerization of alpha, beta-ethylenically unsaturated monomers. Examples of such monomers are styrene, vinyl toluene, methacrylic acid and derivatives thereof, acrylic acid and derivatives thereof, halogenated monomers such as vinyl chloride and vinylidene chloride, and vinyl esters. The surfactant is especially useful with vinyl acetate copolymer emulsions wherein it is desired to prepare the emulsion at a solids level approximately 65% by weight. Emulsions made using the surfactant of the present invention are not only stable but also exhibit satisfactory viscosity for typical commercial application.

It is believed the surfactant of the present invention facilitates polymerization by forming micelles which solubilize the monomer starting materials. It is also believed that the presence of the sulfate of the neutralizing base causes the micelle to expand so that more polymer (i.e., higher solids) can be brought into the emulsion.

The surfactant of the present invention may be used to prepare high solids latexes as follows. First, water, a protective colloid, the surfactant, and a pH buffer such as NaHCO$_3$ are charged to a suitable reaction vessel. The mixture is then heated to reaction temperature under a blanket of inert gas and with stirring at which point is added a polymerization initiator such as, potassium persulfate, for example and from about 5% to 20% of the monomer or blend. An exothermic reaction occurs and is allowed to subside whereupon is begun the gradual addition of the remaining monomer and additional initiator. These additions take place over a specified time period which is dependent upon removal of the heat of reaction. Such time period may be anywhere from one to six hours, typically three to five hours. During that time, the product increases in viscosity to that of or slightly exceeding the viscosity of the final product. Significantly, at no time does the viscosity of the reaction mixture become so high as to be considered unmanageable. Departures from or modifications of the above procedure may be made and will be obvious to one skilled in the art. Such modifications are within the scope of the invention.

The protective colloid may be any water soluble polymeric material commonly used for this purpose. Examples are polyvinyl alcohol, polyvinylpyrrolidone, polyvinyl methyl ether/maleic anhydride, natural gums such as gum arabic or guar gum and various cellulose derivatives such as hydroxyethyl cellulose or sodium carboxymethyl cellulose. Hydroxyethyl cellulose is preferred. Materials such as glycols may be added as may additional surfactants without departing from the invention.

Example 1 illustrates the stability of the surfactant of the present invention.

EXAMPLE 1

A nonyl phenol tetra ethoxylate was reacted in a continuous falling film reactor with 64.7% of the stoichiometric quantity of sulfur trioxide. The resulting sulfuric acid was neutralized with aqueous NaOH. Sufficient nonyl phenol tetra ethoxylate was added to adjust the nonionic content to 40% of the active surfactant. An aqueous dispersion was prepared to which sodium sulfate was added to an arbitrarily determined level of 2.5–3.0% of the total dispersion. The dispersion was milky and did not separate upon ageing either at room temperature or at 50° C. or upon freezing. The dispersion is stable, however, only when the sodium sulfate is added. The final composition was as follows:

| Anionic Content | 15.04% |
|---|---|
| Nonionic Content | 10.60% |
| Na$_2$SO$_4$ | 2.91% |
| Solids, Content | 29.25% |

A similar dispersion prepared without the sodium sulfate separated into distinct layers upon standing overnight.

Examples 2–9 illustrate the preparation of latexes using the surfactant of the present invention. Among the characterizing parameters presented are coagulum content and mechanical stability. Coagulum is the weight % of residue that results when the latex is poured through a double layer of cheesecloth, and the cloth washed with cold water. Mechanical stability is assessed after mixing the latex in a Hamilton Beach drink mixer for 15 minutes. All viscosities were measured with a Brookfield viscometer spun at 30 r.p.m using various spindles.

EXAMPLE 2

To a glass polymerization vessel was added 202.8 parts deionized water, 2.2 parts Cellosize WP-09 (hydroxethyl cellulose), 85.2 parts of the surfactant of Example 1, 24.0 parts of Polystep B-19 (a polyethoxysulfate of lauryl alcohol containing 30 moles of ethylene oxide), and 2.2 parts NaHCO$_3$. This was heated with stirring to 65° C. while a flow of nitrogen was maintained across the mix. At this point, one part of K$_2$S$_2$O$_8$ and 62.4 parts of a monomer mix consisting of 498.9 parts vinyl acetate and 124.7 parts butyl acrylate were added and allowed to react until the resulting exotherm subsided. Addition of the remaining monomer mix was begun at this time and carried out a constant rate over a period of 4.5 hours. During this time a solution of 0.7 parts K$_2$S$_2$O$_8$ in 58.3 parts deionized water was added in five equal increments at equal intervals. The resulting latex displayed the following properties:

| Solids | 63.9% |
|---|---|
| pH | 5.1 |
| Viscosity (#4 spindle) | 2850 cps |
| Coagulum | 0.06% |
| Mechanical Stability | good |

EXAMPLE 3

The procedure of Example 2 was repeated using 95.9 parts of the surfactant of Example 1 and 5.2 parts of Polystep B-23 (a polyethoxysulfate of lauryl alcohol containing 12 moles of ethylene oxide). The initial water charge was 210.9 parts. A satisfactory latex resulted having a lower viscosity than that of Example 2, but which contained a trace of grit.

| Solids | 64.46% |
|---|---|
| pH | 5.17 |
| Viscosity (#4 spindle) | 1850 cps |
| Coagulum | 0.06% |
| Mechanical Stability | good |

EXAMPLE 4

The procedure of Example 3 was repeated using 11.1 parts of Polystep B-27 (a polyethoxysulfate of nonyl phenol containing 4 moles of ethylene oxide) instead of the Polystep B-23. The initial water charge was 205 parts. A satisfactory latex resulted which contained a trace of grit.

| Solids | 64.39% |
|---|---|
| pH | 5.2 |
| Viscosity (#4 spindle) | 1980 cps |
| Coagulum | 0.08% |
| Mechanical Stability | good |

EXAMPLE 5

The latex of Example 2 was repeated using Polystep F-95B (a nonyl phenol polyethoxylate containing 34 moles of ethylene oxide) as a nonionic cosurfactant. It was found that a substantial portion of the surfactant mix had to be nonionic in order to achieve results comparable to the earlier samples. Even then, the grit content was noticeably higher. Thus, 42.6 parts of the surfactant of Example 1 and 26.7 parts of Polystep F-95B were charged along with 242.7 parts of water. A satisfactory latex resulted.

| Solids | 64.34% |
|---|---|
| pH | 5.2 |
| Viscosity (#3 spindle) | 996 cps |
| Coagulum | 0.68% |
| Mechanical Stability | good |

EXAMPLE 6

For comparative purposes the latex of Example 5 was repeated using a commercial octyl phenol based surfactant of similar composition to and in place of the surfactant of Example 1. A latex resulted which had an unsatisfactory high level of coagulum and inferior stability.

| Solids | 64.76% |
|---|---|
| pH | 5.09 |
| Viscosity (#3 spindle) | 1216 cps |
| Coagulum | 1.11% |
| Mechanical Stability | poor |

EXAMPLE 7

The preparation of Example 6 was repeated with the exception that the surfactant components were charged directly to the reaction vessel. The anionic component was 56.9% of the total weight of the surfactant. The nonionic and sodium sulfate components were 35.5% and 7.6%, respectively, of the total surfactant. A satisfactory latex resulted.

| Solids | 64.34% |
|---|---|
| pH | 5.1 |
| Viscosity (#4 spindle) | 1320 cps |
| Coagulum | 0.11% |
| Mechanical Stability | excellent |

EXAMPLE 8

An acrylic latex was prepared in a manner similar to Example 2 by charging 448.1 parts deionized water, 45.0 parts of the surfactant in Example 1, and 15.7 parts Polystep B-27 to a polymerization vessel and heating under nitrogen to 70° C. At this point 0.5 parts $K_2S_2O_8$ and 20% of a monomer mix consisting of 215 parts each of butyl acrylate and methyl methacrylate and 8.8 parts methacrylic acid are added and the mix allowed to react until the exotherm subsides. The addition of the remaining monomer is then begun at a rate such that the addition is completed in one hour. Concomitantly, but separately, is added a solution consisting of 36.6 parts deionized water and 1.5 parts $K_2S_2O_8$. After the additions have been completed, the temperature is maintained at 70°–75° C. for an additional hour, whereupon the latex is cooled to ambient temperature. A mixture consisting of 5.1 parts deionized water and 5.1 parts 28% ammonia is added to adjust the pH. A satisfactory latex is obtained.

| Solids | 45.23% |
|---|---|
| pH | 8.93 |
| Viscosity (#1 spindle) | 64 cps |
| Coagulum | 0.08% |

EXAMPLE 9

A styrene acrylic latex was prepared in the manner of Example 9 by replacing the methyl methacrylate with styrene and using 30 parts of the surfactant of Example 1 and 22 parts of Polystep A-18-S (alpha olefin sulfonate). A satisfactory latex resulted.

| Solids | 44.62% |
|---|---|
| pH | 9.07 |
| Viscosity (#3 spindle) | 2504 cps |
| Coagulum | 0.32% |

What is claimed is:
1. A surfactant comprising
   (a) about 37% by weight of nonyl phenol tetra ethoxylate, and
   (b) about 53% by weight of a sulfate salt of nonyl phenol tetra ethoxylate produced as the reaction product of nonyl phenol tetra ethoxylate and a sulfating agent, forming a nonyl phenol tetra ethoxylate sulfuric acid, said acid is then neutralized with a neutralizing base selected from the group consisting of alkali metal hydroxides, ammonium hydroxides and amines, and
   (c) about 10% by weight of the sulfate salt of said neutralizing base, said surfactant being useful in the preparation of high solids emulsion polymers.
2. The surfactant of claim 1 wherein said sulfate salt of said neutralizing base is sodium salt.
3. The surfactant of claim 1 wherein said sulfate salt of said neutralizing base is ammonium salt.
4. A surfactant comprising
   (a) about 37% by weight of nonyl phenol tetra ethoxylate, and
   (b) about 53% by weight of a sulfate salt of nonyl phenol tetra ethoxylate produced as the reaction product of nonyl phenol tetra ethoxylate and a sulfating agent, forming a nonyl phenol tetra ethoxylate sulfuric acid, said acid is then neutralized with a neutralizing base selected from the group consisting of sodium hydroxide and ammonium hydroxide, and
   (c) about 10% by weight of the sulfate salt of said neutralizing base selected from the group consisting of sodium sulfate and ammonium sulfate, said surfactant being useful in the preparation of high solids emulsion polymers.

* * * * *